US008538235B2

(12) United States Patent
Nabeshima

(10) Patent No.: US 8,538,235 B2
(45) Date of Patent: Sep. 17, 2013

(54) REPRODUCING DEVICE, REPRODUCING METHOD, PROGRAM AND RECORDING MEDIUM

(75) Inventor: Shinji Nabeshima, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/413,869

(22) Filed: Mar. 7, 2012

(65) Prior Publication Data

US 2012/0163772 A1 Jun. 28, 2012

Related U.S. Application Data

(63) Continuation of application No. PCT/JP2010/002706, filed on Apr. 14, 2010.

(30) Foreign Application Priority Data

Oct. 22, 2009 (JP) ................................ 2009-243435

(51) Int. Cl.
*H04N 9/80* (2006.01)
*H04N 5/95* (2006.01)
*G11B 27/00* (2006.01)
*G06F 7/00* (2006.01)
*G06F 17/30* (2006.01)

(52) U.S. Cl.
USPC ........... 386/239; 386/241; 386/248; 386/278; 386/280; 386/282; 386/285; 707/705; 707/706; 707/707; 707/711; 707/723

(58) Field of Classification Search
USPC ................. 386/239, 241, 248, 278, 280, 282, 386/285; 707/705, 706, 707, 711, 723
See application file for complete search history.

(56) References Cited

U.S. PATENT DOCUMENTS

| 5,726,702 | A | 3/1998 | Hamaguchi et al. | |
|---|---|---|---|---|
| 7,873,905 | B2 * | 1/2011 | Taguchi et al. | 715/723 |
| 2001/0026678 | A1 | 10/2001 | Nagasaka et al. | |
| 2006/0236338 | A1 | 10/2006 | Shimoda | |
| 2008/0147664 | A1 | 6/2008 | Fujiwara et al. | |
| 2009/0141315 | A1 | 6/2009 | Hachiro | |
| 2010/0008637 | A1 * | 1/2010 | Yoshimura et al. | 386/46 |
| 2010/0293169 | A1 * | 11/2010 | Takata et al. | 707/749 |

FOREIGN PATENT DOCUMENTS

| JP | 7-236099 | | 9/1995 |
|---|---|---|---|
| JP | 2001-257956 | | 9/2001 |
| JP | 2005-252970 | | 9/2005 |
| JP | 2008-152585 | | 7/2008 |
| JP | 2009-134038 | | 6/2009 |
| WO | WO 2009/113266 | * | 9/2009 |

OTHER PUBLICATIONS

International Search Report issued Jul. 13, 2010 in corresponding International Application No. PCT/JP2010/002706.

* cited by examiner

*Primary Examiner* — Daquan Zhao
(74) *Attorney, Agent, or Firm* — Wenderoth, Lind & Ponack L.L.P.

(57) ABSTRACT

A reproducing method includes: a keyword specifying step of specifying a plurality of keywords corresponding to one unit being reproduced; a keyword switching step of switching the plural keywords that have been specified, by every constant or different time interval, to choose one keyword; and a list display step of allowing the symbols of the respective contents of video or sound relating to each of the keywords that have been chosen by the keyword switching step to be switched and to be listed.

3 Claims, 11 Drawing Sheets

REPRODUCING DEVICE, REPRODUCING METHOD, PROGRAM AND RECORDING MEDIUM

CROSS-REFERENCE TO RELATED APPLICATIONS

This application is a continuation application of PCT International Patent Application No. PCT/JP2010/002706 filed Apr. 14, 2010, claiming the benefit of priority of Japanese Patent Application No. 2009-243435 filed Oct. 22, 2009, all of which are incorporated by reference herein in their entirety.

TECHNICAL FIELD

The present invention relates to a reproducing device, a reproducing method, a program and a recording medium. For example, it relates to a reproducing device, a reproducing method and so forth which can reproduce video, music or the like of plural media.

BACKGROUND ART

In recent years, more and more reproducing devices have been provided which not only can reproduce information gained from one medium, but also can reproduce information gained from plural media.

For example, a digital television with a combined recorder not only can display moving image data gained through the receipt of a broadcast wave, but also can reproduce and display moving image data that has been once recorded, or can reproduce music data that is recorded on an optical disk.

Furthermore, with a mobile phone, a mobile terminal or the like, information from much more media can be reproduced nowadays, moving image data gained through the receipt of a One-seg broadcast can be displayed, moving image data of a One-seg broadcast that has been recorded through the use of a recording function can be reproduced and displayed, moving image data that has been recorded through the use of a videotaping function can be reproduced and displayed, still image data that has been taken through the use of a camera function can be displayed, and moving image data that has been obtained over the Internet through the use of an Internet connection communication function can be displayed.

Now, when such a reproducing device which can display information from plural media is used, some desire, reproducing a content that has been obtained from a certain medium, to successively browse contents of other media related to the content, or to temporarily have a browse. For example, some desire, watching a baseball game via a One-seg broadcast, to browse other contents about participating players, or to browse other contents about participating teams.

In view of such desire, a television device has been proposed which can reproduce and display program information related to the television broadcasting programs (for example, see Patent Document 1).

FIG. 10 shows a block diagram of a television device that is proposed in Patent Document 1.

A television device 101 has a television receiving/displaying part 102 which is constituted similarly to a general television receiver, and further, a clock device 104 which ticks for year, month and day/time and outputs this as time information, an optical disk reproducing device 105 and the like are built in.

In an optical disk medium 106 reproduced by the optical disk reproducing device 105, program information and so on related to the television broadcasting programs are recorded, and at least broadcasting information such as the broadcasting program name, the channel name of the program, the broadcasting date, the broadcasting time (the broadcasting start time, and the broadcasting termination time) and so on, and attendant information besides this broadcasting information are recorded as the program information. The attendant information is information related to the contents of the television broadcasting programs, and is multimedia data such as image data like a moving image, a still image and so on, audio data like music, sound effects and so on, text data and so on.

When a desired television broadcasting program is being received, in case the attendant information relating to this is allowed to be reproduced and displayed, a user operates a selection determination inputting means 110 such as a remote controller and so on to input a reproduction display operation request, and allows this to be transferred to a system controlling part 103.

The system controlling part 103, receiving this reproduction display request, recognizes the channel name of the television broadcasting program being received, the current year, month and day/time and the like as receive data, and transfers the reproduction display request and this receive data to a controlling part 108 in the optical disk reproducing device 105 as a control command.

The controlling part 108 recognizes, by this control command, the reproduction display request of the attendant information, the channel name of the television broadcasting program being received and the current year, month and day/time, and controls an optical disk drive 107 to read out the predetermined attendant information related to the television broadcasting program being received from the optical disk medium 106. At this time, specifically, the controlling part 108, by allowing the channel name of the television broadcasting program being received and the current year, month and day/time, which is the receive data of the control command, to be search information, and further allowing the above broadcasting information that is recorded on the optical disk medium 106 to be a search key, controls the optical disk drive 107 to read out the attendant information related to the television broadcasting program being received from the optical disk medium 106.

The attendant information that has been read out from the optical disk medium 106 by the optical disk drive 107 is inputted to an optical disk/television interface means 109. Here, the attendant information is, by the optical disk/television interface means 109, converted into a video signal displayable with the television receiving/displaying part 102 (for example, a video signal of the NTSC format and so on) and an audio signal (for example, an analogue audio signal and so on), which are supplied to a video signal input terminal and an audio signal input terminal of the television receiving/displaying part 102 respectively. This allows the attendant information that is recorded on the optical disk medium 106 to be reproduced and displayed, while linked to the television broadcasting program being received, with the television device 101.

FIG. 11 shows an example of the attendant information displayed on a screen of the television device 101.

For example, in this way, while the television broadcasting program being received is displayed on a parent screen 111, the attendant information is displayed on a child screen 112.

PRIOR ART DOCUMENTS

Patent Document

Patent Document 1: Japanese Patent Laid-Open No. H7-236099

SUMMARY OF INVENTION

Problems to be Solved by Invention

However, with the above conventional television device, there are cases where it takes time for a user to find out the information the user desires from among the information relating to the television broadcasting program being received.

Namely, with the above conventional television device, when a user inputs a reproduction display request, since the optical disk medium 106 is searched automatically for the attendant information relating to the television broadcasting program being received and the reproduction and display is started, no problems arise if the information the user desires exists near the beginning of the attendant information, but in case it is reproduced in the rear of the attendant information, the desired information can not be confirmed unless wait time is spent in reproducing thereto. Furthermore, even in case a search function such as fast-forwarding and so forth exists, in case it is disposed at the rear of the attendant information, it takes time to find out the desired information.

Furthermore, only the attendant information that was recorded on the optical disk medium 106 beforehand can be obtained, in case the information a user desires is not contained in the attendant information, the time spent in attempting to find out the desired information comes to nothing.

An object of the present invention is, in view of the problems of the above conventional television device, to provide a reproducing device, a reproducing method and so forth with which a content a user desires, which is a content related to the content being reproduced, is found more easily than before.

Means of Solving Problem

In order to solve the above-described problem, the $1^{st}$ aspect of the present invention is a reproducing device, comprising:

a reproducing part which reproduces video or sound;

a list display instruction part which gives an instruction for list display of symbols of contents of video or sound relating to one unit of said video or sound being reproduced;

a content relation information storing part in which content relation information is stored that is constituted by the symbol of said content and a keyword that is appended to the content;

a keyword specifying part which specifies a plurality of keywords corresponding to said one unit being reproduced;

a keyword switching part which switches the plural keywords that have been specified by said keyword specifying part, by every constant or different time interval, to choose one keyword;

a symbol interchanging part which searches for, with a keyword that has been chosen by said keyword switching part, said keywords of said content relation information of said content relation information storing part, to detect relating contents, specifies the symbols of the relating contents and, every time the keywords are switched by said keyword switching part, interchanges said symbols that have been specified; and a list display controlling part which allows the symbols that have been specified by said symbol interchanging part to be switched by said reproducing part and to be listed on a screen, wherein said list display controlling part acts at least after said instruction for list display has been supplied.

Furthermore, the $2^{nd}$ aspect of the present invention is the reproducing device according to the $1^{st}$ aspect of the present invention, wherein said keyword specifying part acts after said instruction for list display has been supplied.

Furthermore, the $3^{rd}$ aspect of the present invention is the reproducing device according to the $1^{st}$ aspect of the present invention, wherein said one unit being reproduced is, on an occasion of said list display, displayed side by side with said symbols.

Furthermore, the $4^{th}$ aspect of the present invention is the reproducing device according to the $1^{st}$ aspect of the present invention, wherein said one unit is one program or one tune, of said video or sound.

Furthermore, the $5^{th}$ aspect of the present invention is the reproducing device according to the $4^{th}$ aspect of the present invention, wherein the keywords are prepared beforehand for said one program or one tune, and said keyword specifying part specifies a plurality of said keywords using said keywords that are prepared beforehand.

Furthermore, the $6^{th}$ aspect of the present invention is the reproducing device according to the $1^{st}$ aspect of the present invention, wherein said one program or one tune of the video or sound is partitioned into plural periods of time, and said one unit is a predetermined one period of time out of said plural periods of time.

Furthermore, the $7^{th}$ aspect of the present invention is the reproducing device according to the $6^{th}$ aspect of the present invention, further comprising a program annex information storing part which stores subtitling data corresponding to said video, wherein when said instruction for list display has been supplied, said keyword specifying part specifies a plurality of said keywords by extracting a plurality of said keywords from said subtitling data corresponding to said predetermined one period of time corresponding to the timing of the instruction.

Furthermore, the $8^{th}$ aspect of the present invention is the reproducing device according to the $6^{th}$ aspect of the present invention, further comprising an allocated keyword storing part which stores one or plural keywords that are allocated beforehand to said individual periods of time, wherein when said instruction for list display has been supplied, said keyword specifying part specifies a plurality of said keywords by taking out, from said allocated keyword storing part, a plurality of said keywords that are allocated beforehand to said predetermined one period of time corresponding to the timing of the instruction.

Furthermore, the $9^{th}$ aspect of the present invention is the reproducing device according to the $6^{th}$ aspect of the present invention, wherein in case said predetermined one period of time has terminated when said list display is being carried out, said keyword specifying part newly specifies a plurality of keywords corresponding to the next one period of time, said keyword switching part switches the plural keywords that have been newly specified by said keyword specifying part, by every constant or different time interval, to choose one keyword, said symbol interchanging part detects, with a keyword that has been chosen by said keyword switching part from among said plural keywords that have been newly specified, relating contents, specifies the symbols of the relating contents and, every time the symbols are switched by said keyword switching part, interchanges the specified symbols, and said list display controlling part allows the symbols that have been specified by said symbol interchanging part to be switched by said reproducing part and to be listed on said screen.

Furthermore, the $10^{th}$ aspect of the present invention is the reproducing device according to the $6^{th}$ aspect of the present invention, further comprising:

a symbol selection instruction part which selects, from among said symbols that are being listed, any symbol and gives an instruction; and a selection cancellation instruction part which provides a selection cancellation instruction to cancel a selection instruction action by said symbol selection instruction part, wherein said reproducing part enlarges, when a symbol has been selected by said symbol selection instruction part, a display size of the content corresponding to the selected symbol to carry out reproduction and display on said screen, and restores, in case said selection cancellation instruction has been given by said selection cancellation instruction part when the content corresponding to said selected symbol is being reproduced and displayed, the list display that was displayed when said symbol was selected, to carry out the list display on said screen.

Furthermore, the $11^{th}$ aspect of the present invention is the reproducing device according to the $1^{st}$ aspect of the present invention, wherein said list display controlling part also allows the symbols to be displayed on said list display, which are symbols corresponding to the contents that do not relate to said keyword and that are such contents as another medium has besides a medium that has the contents with said corresponding symbols being displayed related to said keyword, and allows the symbols corresponding to the contents said another medium has to be displayed in smaller size than the symbols of the contents relating to said keyword.

Furthermore, the $12^{th}$ aspect of the present invention is a reproducing method, comprising:

a reproducing step of reproducing one unit of video or sound;

a list display instruction step of giving an instruction for list display of symbols of contents of video or sound relating to said one unit being reproduced;

a keyword specifying step of specifying, by a keyword specifying part, a plurality of keywords corresponding to said one unit being reproduced;

a keyword switching step of switching, by a keyword switching part, the plural keywords that have been specified, by every constant or different time interval, to choose one keyword; and a list display step of allowing the symbols of the respective contents of video or sound relating to each of said keywords that have been chosen by said keyword switching step to be switched and to be listed, wherein said list display step is carried out at least after said instruction for list display has been given.

Furthermore, the $13^{th}$ aspect of the present invention is the reproducing method according to the $12^{th}$ aspect of the present invention, wherein said keyword specifying step is carried out after said instruction for list display has been given.

Furthermore, the $14^{th}$ aspect of the present invention is the reproducing method according to the $12^{th}$ aspect of the present invention, wherein said one unit is one program or one tune, of said video or sound, the keywords are prepared beforehand for said one program or one tune, and said keyword specifying step specifies a plurality of said keywords using said keywords that are prepared beforehand.

Furthermore, the $15^{th}$ aspect of the present invention is the reproducing method according to the $12^{th}$ aspect of the present invention, wherein said one program or one tune of the video or sound is partitioned into plural periods of time, and said one unit is a predetermined one period of time out of said plural periods of time, subtitling data corresponding to said video is supplied, and when said instruction for list display has been given, said keyword specifying step specifies a plurality of said keywords by extracting a plurality of said keywords from said subtitling data corresponding to said predetermined one period of time corresponding to the timing of the instruction.

Furthermore, the $16^{th}$ aspect of the present invention is the reproducing method according to the $12^{th}$ aspect of the present invention, wherein said one program or one tune of the video or sound is partitioned into plural periods of time, and said one unit is a predetermined one period of time out of said plural periods of time, one or plural keywords are allocated beforehand to said individual periods of time, and when said instruction for list display has been given, said keyword specifying step specifies a plurality of said keywords by taking out a plurality of said keywords that are allocated beforehand to said predetermined one period of time corresponding to the timing of the instruction.

Furthermore, the $17^{th}$ aspect of the present invention is a program embodied on a non-transitory computer-readable medium causing a computer to execute said keyword specifying step of specifying a plurality of keywords corresponding to said one unit being reproduced; said keyword switching step of switching the plural keywords that have been specified, by every constant or different time interval, to choose one keyword; and said list display step of allowing the symbols of the respective contents of video or sound relating to each of said keywords that have been chosen by said keyword switching step to be switched and to be listed, of the reproducing method according to the $12^{th}$ aspect of the present invention.

Effects of Invention

By the present invention, it is possible to provide a reproducing device, a reproducing method and so forth with which a content a user desires, which is a content related to the content being reproduced, is found more easily than before.

BRIEF DESCRIPTION OF DRAWINGS

FIG. 10 is a block diagram of a conventional television device with an optical disk reproducing device built in.

MODES FOR CARRYING OUT INVENTION

Hereinafter, embodiments of the present invention are described in detail with reference to the drawings.

Embodiment 1

Figure 1:
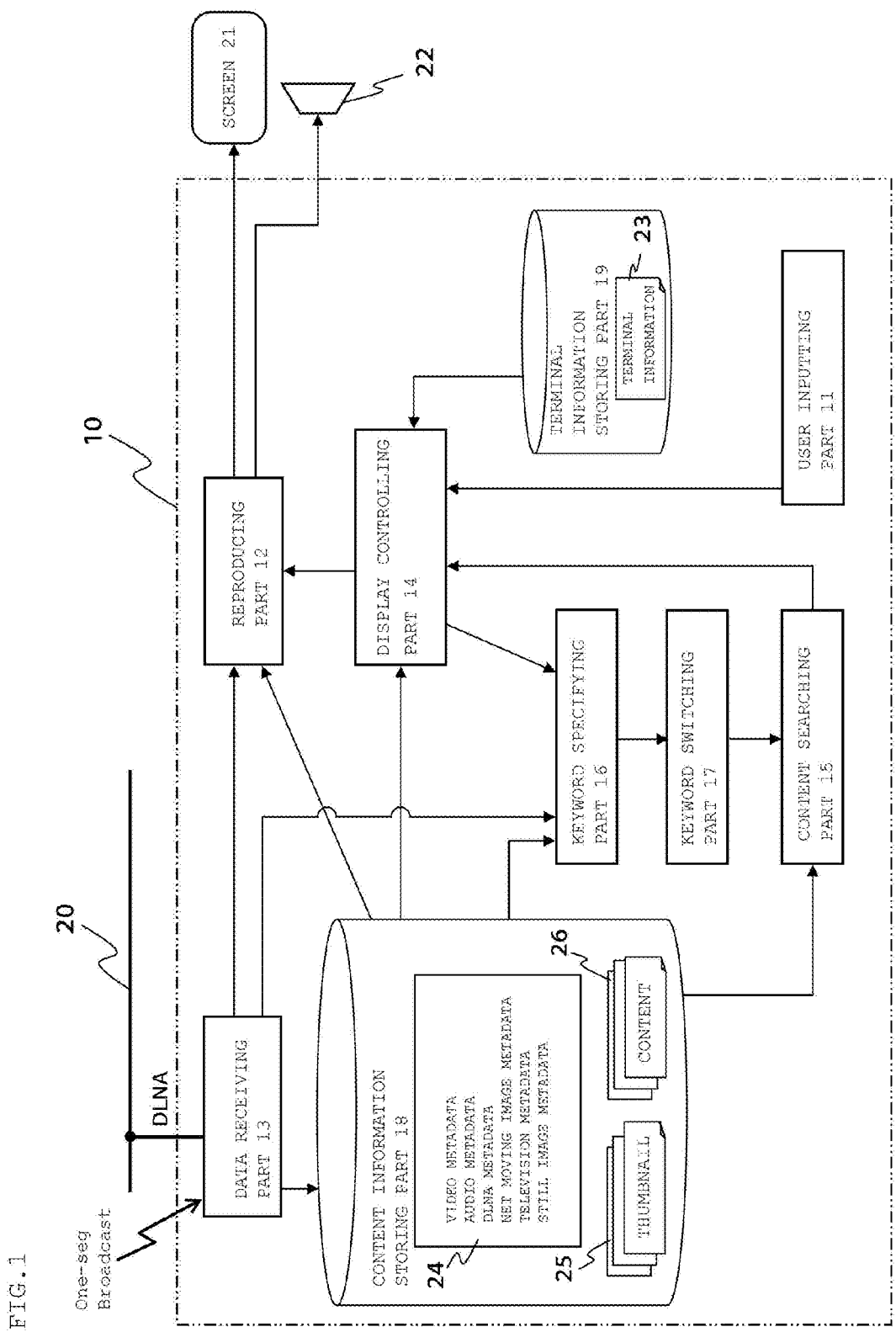
FIG. 1 is a configuration diagram of a reproducing device of Embodiment 1 of the present invention.

FIG. 1 shows a configuration diagram of a reproducing device 10 of Embodiment 1 of the present invention.

A user inputting part 11 accepts a key operation, and a remote controller operation from a user.

A reproducing part 12 performs, in accordance with an instruction from a display controlling part 14, a reproduction of video, a content and the like, a thumbnail view and the like, and outputs them to a screen 21 and a speaker 22. The reproducing part 12, with respect to a content of the current reproduction mode, reads out audio and video data of its content 26 from a content information storing part 18 and reproduces it. The reproducing part 12, in case the mode for reproducing is a One-seg mode or a DLNA mode, receives audio and video data, subtitling data and program contents data from a data receiving part 13, and reproduces the data.

Further, here, video, sound or the like reproduced by the reproducing part 12 is called a "content." The "sound" is music, audio or the like, and an image such as a still image and so on is included among the video.

The display controlling part 14 controls, in accordance with the contents of an instruction accepted by the user inputting part 11, a reproducing action by the reproducing part 12. The display controlling part 14, when the user inputting part 11 accepts a related content listing instruction, allows the reproducing part 12 to list the thumbnails passed from a content searching part 15.

Here and hereafter, unless the contrary is stated explicitly, "listing" means "displaying a list," which may be described with an expression "list display."

Furthermore, the display controlling part 14 allows, when a content is selected from among the thumbnails, which has been allowed to be listed on the screen 21, through an instruction to the user inputting part 11 with cursor keys for pointing up, down, left and right, a determining key and so on, the reproducing part 12 to read out the selected content data (audio and video) 26 from the content information storing part 18 and to reproduce it on the full screen of the screen 21.

Further, the display controlling part 14 is an example of the list display controlling part of the present invention, and the content searching part 15 is an example of the symbol interchanging part of the present invention. Furthermore, the user inputting part 11 which accepts a listing instruction is an example of the list display instruction part of the present invention.

The subtitling data and the program contents data that have been read out from the data receiving part 13 and the content information storing part 18 are also inputted to a keyword specifying part 16.

The data receiving part 13 receives audio and video data, subtitling data, metadata and the like from the outside via a network 20. The network 20 may be one that uses broadcasting, the Internet, Bluetooth (Registered trademark) and so on but the network to be relied on does not matter.

The keyword specifying part 16 analyzes the subtitling data and the metadata (program contents data and so on) 24 that have been received by the data receiving part 13 or have been read out from the content information storing part 18 to take out plural keywords, and notifies a keyword switching part 17 of the keywords. The keyword switching part 17, which has been notified of those plural keywords, notifies the content searching part 15 of one keyword that has been successively selected from among those plural keywords every constant time interval.

In case, with respect to the one keyword that has been selected by the keyword switching part 17 from among the specified plural keywords, which have been specified by the keyword specifying part 16, contents relating to the keyword concerned are found by the content searching part 15, the content searching part 15 obtains thumbnails 25 of the contents from the content information storing part 18, and passes them to the display controlling part 14.

Further, the content information storing part 18 is an example of the content relation information storing part of the present invention. Furthermore, the thumbnail 25 that is being stored in the content information storing part 18 is an example of the symbol of the present invention, and the keyword contained in the metadata 24 is an example of the keyword that is appended to the content of the present invention. Furthermore, the content information storing part 18 which stores the subtitling data is also an example of the program annex information storing part of the present invention.

The content searching part 15 searches, in case the keyword is switched to another by the keyword switching part 17, the metadata 24 in the content information storing part 18 for the keyword and passes, in case it is found, the thumbnails 25 corresponding to the metadata 24 to the display controlling part 14.

The video reproduced by the reproducing part 12 is outputted to the screen 21, and the audio reproduced by the reproducing part 12 is outputted from the speaker 22. The screen 21 is exemplified by a display device such as a liquid crystal device and so on.

The audio and video data, the subtitling data, the program contents data and so on the data receiving part 13 has received are stored in the content information storing part 18. A storage system performs, for example, recording of One-seg programs, downloading via a network, and so on. Furthermore, a memory that is built in the reproducing device 10, a demountable memory card, and so on can be used as the content information storing part 18.

Furthermore, terminal information 23 such as the information of the contents (the contents that were reproduced lastly) of individual modes, the current reproduction mode information and so on is being stored in a terminal information storing part 19.

Further, the constitution of an example shown in FIG. 1 is a constitution in which the screen 21 and the speaker 22 are connected to the outside of the reproducing device 10, but a constitution in which the reproducing device 10 has these outputting devices built-in may be employed.

Figure 2:
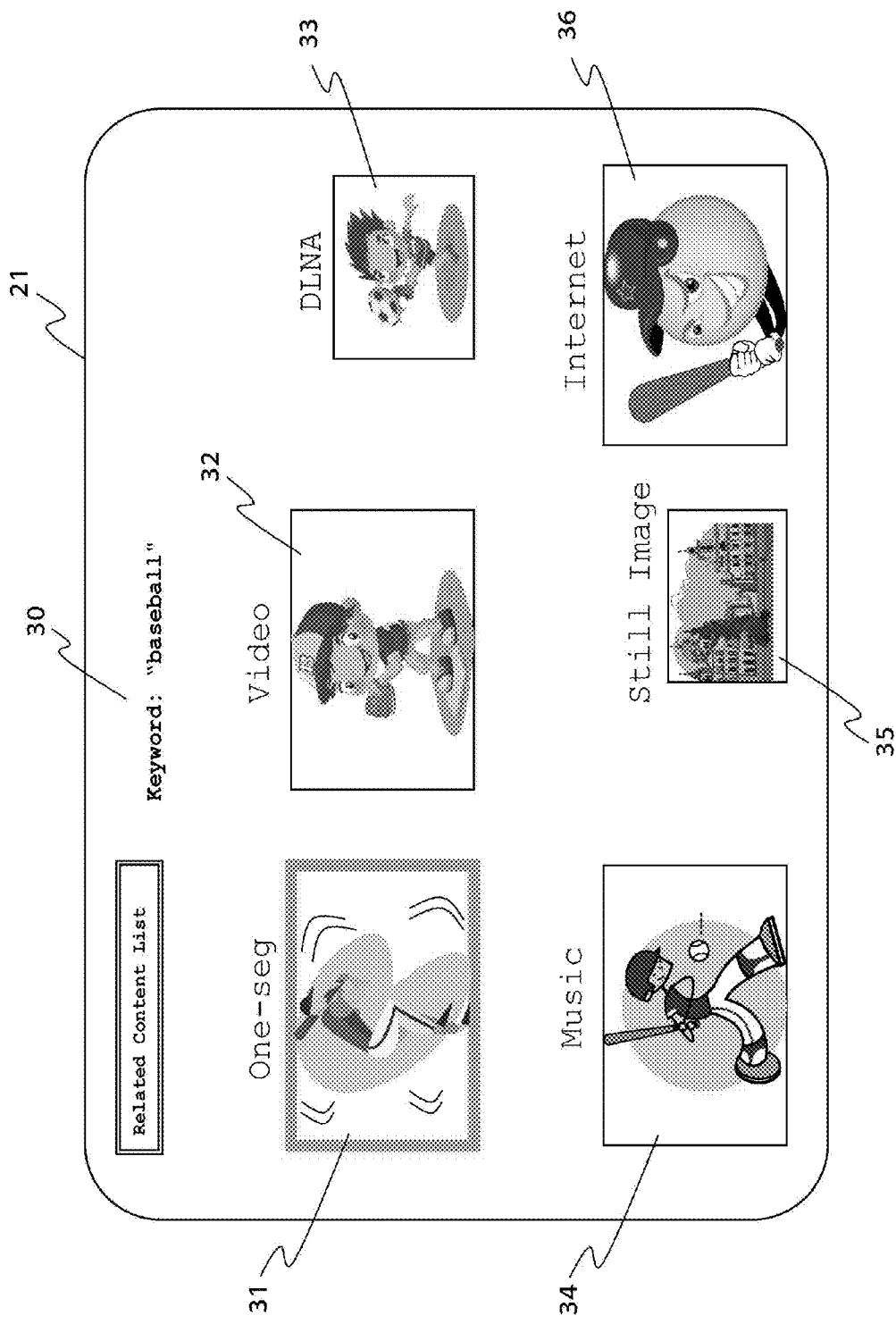
FIG. 2 is a diagram showing an example for display of a related content list that is allowed to be displayed on the screen of the reproducing device of Embodiment 1 of the present invention.

FIG. 2 shows an example for screen display of a related content list that is allowed to be displayed on the screen 21 of the reproducing device 10 of present Embodiment 1.

As shown in FIG. 2, on the screen 21, thumbnail images 32-36 of the contents displayable with this reproducing device 10 are displayed. This screen is a screen which switches the types of contents to reproduce, display is carried out through a press of a home key of a remote controller, a built-in key or the like, and a content a user desires to see is selected and reproduced.

In an example shown in FIG. 2, thumbnails of a One-seg program (a One-seg mode), a video content that has been recorded (a video mode), a video content of a server via a network (a DLNA mode), a music content (a music mode), a still image content (a still image mode), and an internet moving image content (a net moving image mode) are displayed.

When a user selects a thumbnail of the mode he or she desires to see with a key, a touch panel or the like, a remote controller and so on, the content of the thumbnail is reproduced.

In a screen of FIG. 2, in case the One-seg mode is that for use in reproduction, while a reproduced image 31 of the One-seg is displayed, subtitling, program contents data and the like of the One-seg are received, a keyword contained in the subtitling, the program contents data and the like is extracted, contents of other modes relating to the keyword are searched for, and the thumbnail images 32-36 of corresponding contents are displayed. Namely, in case the program contents of the One-seg concerns "baseball," video, music, still images, net moving images from the net and the like, and the content information storing part 18 in which metadata of the DLNA is stored are searched, in case contents of respective modes corresponding to the "baseball" exist, the thumbnail images 32-36 of the contents are displayed in thumbnail areas of the individual modes. Furthermore, keyword display 30 that shows the keyword that has been used for search then is the "baseball" is also displayed.

As the program contents, the contents of the subtitling data or the like change, the thumbnail images 32-36 of other modes are renewed successively so that the thumbnail images 32-36 relating to the contents will be displayed.

Furthermore, in case plural keywords are extracted from the content being reproduced, switching for display with one keyword used for search is carried out every constant time interval, and the thumbnail images 32-36 of other modes are renewed successively so that the thumbnail images 32-36 relating to the keywords that have been switched every constant time interval will be displayed.

And, when a user selects any of the thumbnail images 32-36 of other modes with a remote controller, a touch panel or the like, the content of the thumbnail is reproduced in full screen on the screen 21.

Next, an action of a related content listing process in the reproducing device 10 of present Embodiment 1 is described.

Figure 3:
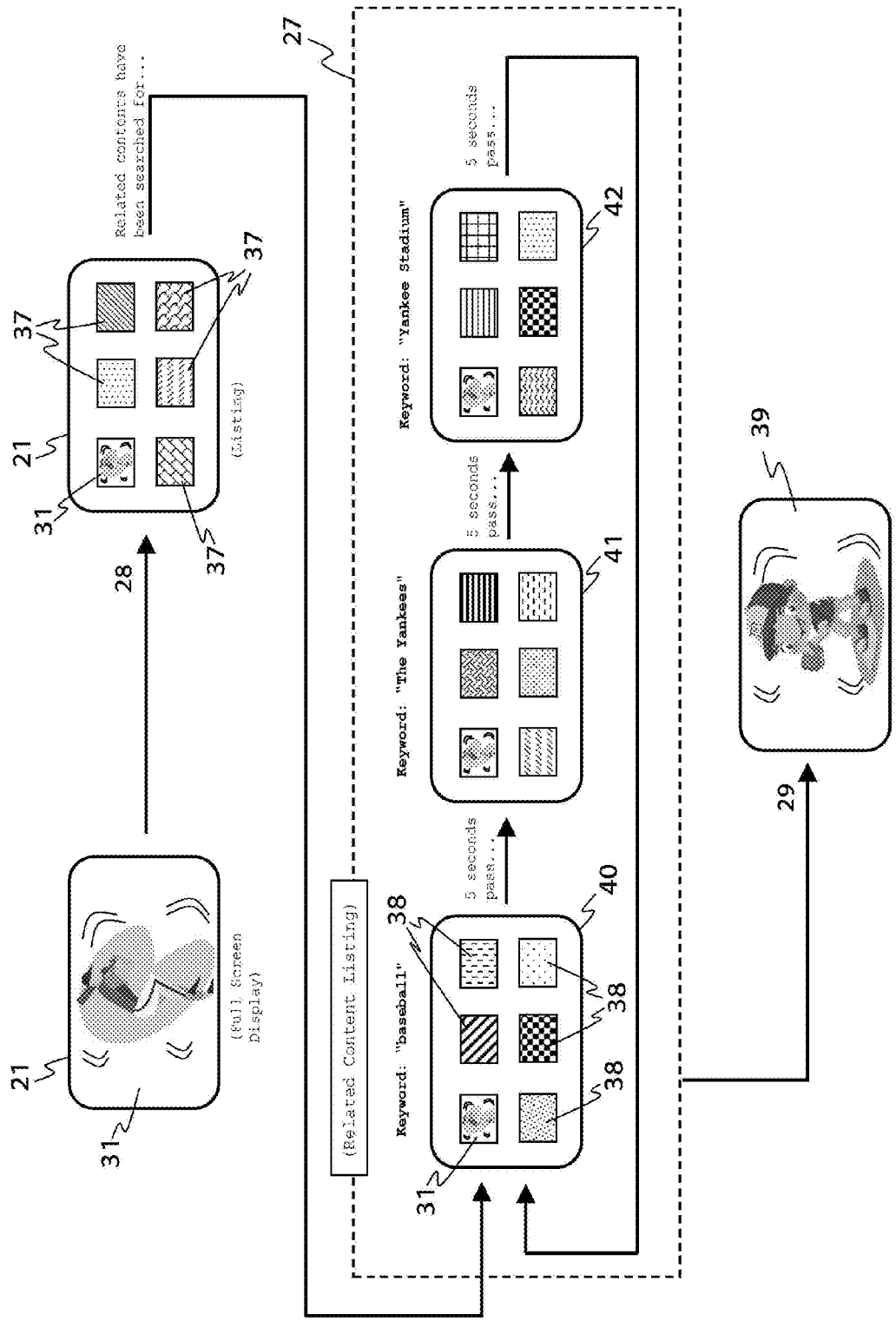
FIG. 3 is a diagram showing display transition of the screen at the time of a process of listing related contents and of reproducing a related content that has been selected from the listing, of the reproducing device of Embodiment 1 of the present invention.
Figure 4:
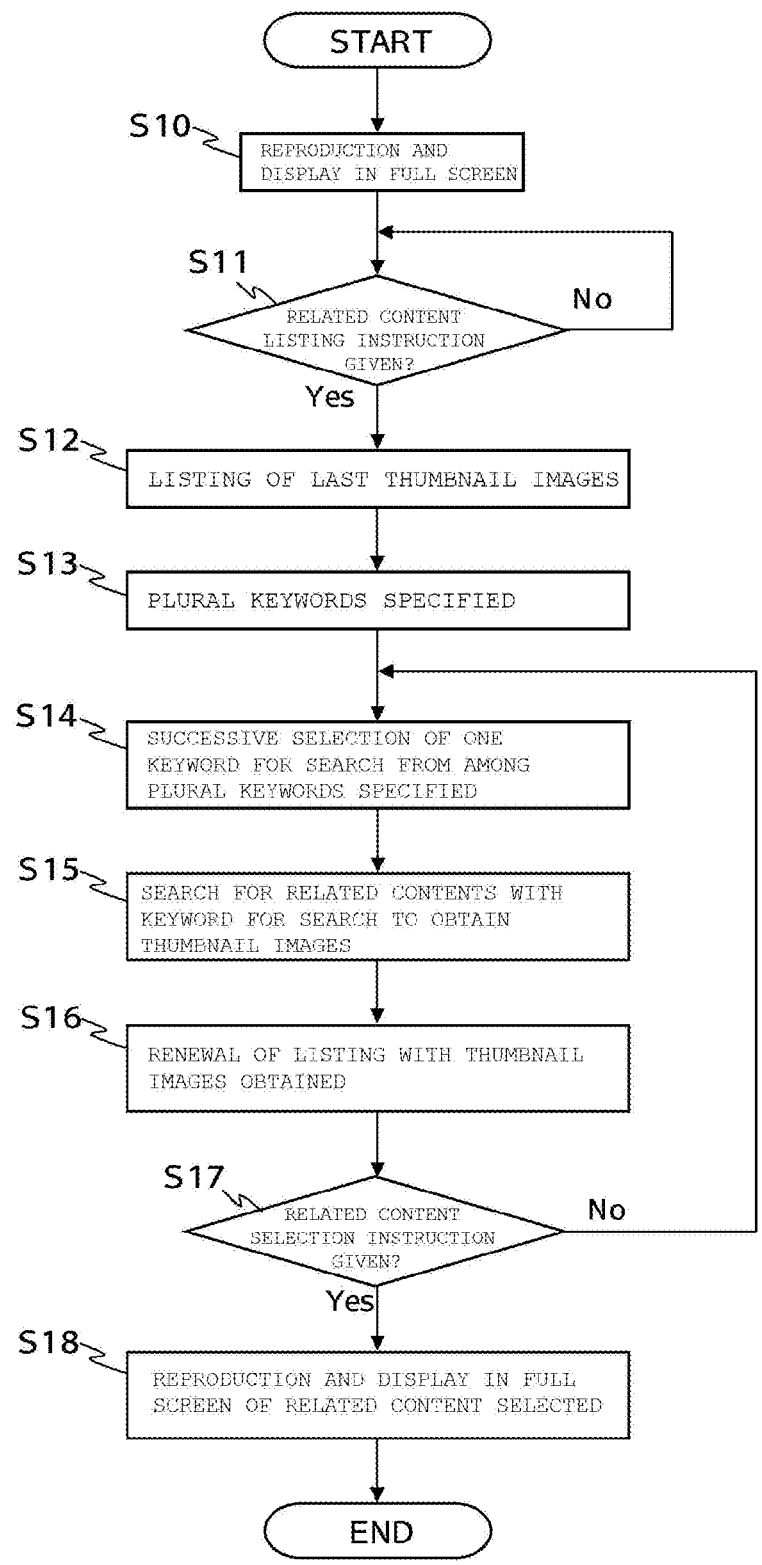
FIG. 4 is a diagram showing a processing flow at the time of a process of listing related contents and at the time of a process of reproducing a related content that has been selected from the listing, of the reproducing device of Embodiment 1 of the present invention.

FIG. 3 shows display transition of the screen for describing a process of listing related contents and a process of reproducing a related content that has been selected from the listing in the reproducing device 10 of present Embodiment 1, and FIG. 4 shows a processing flow on that occasion in the reproducing device 10.

Here, an action is described with respect to a case where, when a reproduction is being carried out in a One-seg mode, a request for related content listing is received from a user, and the user has selected a related content from the related content listing.

When the reproduced image 31 of a One-seg broadcast that has been received by the data receiving part 13 is being reproduced and displayed on the full screen of the screen 21 (Step S10), an input from a home key is taken at the user inputting part 11 (Step S11), then listing of related contents is considered to have been requested from a user, and a related content listing instruction 28 is notified to the display controlling part 14 from the user inputting part 11. Unless there is a request for related content listing from a user, full screen display of the reproduced image 31 is continued.

The display controlling part 14 obtains, when the related content listing instruction 28 is notified, the last reproduced content information of individual modes from the terminal information storing part 19, obtains the thumbnails 25 of the content from the content information storing part 18, and allows the reproducing part 12 to display the last thumbnail images 37 of individual modes (Step S12).

Furthermore, the display controlling part 14 obtains the current reproduction mode information from the terminal information storing part 19 and, based on the reproduced content information of the mode, allows the reproducing part 12 to read out, from the content information storing part 18 (in the case of the video, music, or still image mode) or the data receiving part 13 (in the case of the One-seg, DLNA, or net moving image mode), the audio and video data, the subtitling data, and the program contents data and to reproduce them.

In this case, since the current reproduction mode is a One-seg mode, at this time, on the screen 21, along with the reproduced image 31 of the One-seg mode the display size of which is allowed to be smaller, the thumbnail images 37 of the last reproduced contents of individual modes are displayed side by side.

Furthermore, the display controlling part 14 provides the keyword specifying part 16 with a keyword specification instruction, and the keyword specifying part 16 which has received the keyword specification instruction receives or reads out the subtitling data and the program contents data of the content being reproduced from the data receiving part 13 or the content information storing part 18 to analyzes them, and specifies plural keywords (Step S13).

The keyword switching part 17 selects one keyword from among the plural keywords that have been specified by the keyword specifying part 16, and notifies the keyword as a keyword for search to the content searching part 15. After that, the keyword switching part 17 switches successively to another keyword among the plural keywords that have been specified by the keyword specifying part 16 every constant time interval (for example, every five seconds) and, every time the keywords are switched, notifies the keyword as a keyword for search to the content searching part 15 (Step S14).

The content searching part 15 searches for contents relating to the keyword for search that has been selected by the keyword switching part 17 and notified, using the metadata 24 in the content information storing part 18, obtains the thumbnails 25 of the contents that have been found, and passes them to the display controlling part 14 (Step S15).

Further, when a content 26 is stored in the content information storing part 18, the metadata 24 corresponding to the content 26 is also stored in the content information storing part 18. The DLNA metadata and the net moving image metadata are received regularly by the data receiving part 13 from the network 20 and stored in the content information storing part 18.

Metadata of the One-seg mode contains, for example, program contents data, subtitling data and the like. Metadata of the video mode contains, for example, program contents data, subtitling data and the like of the programs that have been recorded. Metadata of the music mode contains, for example, artist names, song titles and the like. Metadata of the still image mode contains comments a user inputted and so on.

And, the display controlling part 14 allows the display of the screen 21 to be renewed by the reproducing part 12 so that the thumbnails 25 that have been obtained will be displayed (Step S16). Hence, as shown in FIG. 3, the last thumbnail images 37 that were being displayed on the listing are, when the related contents are searched for, altered so that the thumbnail images 38 of the related contents that have been searched for will be displayed.

And further, since the keywords are switched every constant time interval (Step S14), the thumbnail images 38 of the related contents of the related content listing 27 are to be switched, every constant time interval, to the thumbnail images 38 of the related contents related to the keywords for search that have been switched (Step S16).

For example, when the plural keywords specified by the keyword specifying part 16 are three keywords "baseball," "The Yankees" and "Yankee Stadium," if the keyword switching part 17 switches these keywords every five seconds, as shown in FIG. 3, in the related content listing 27, switching for display with related content list screen display 40-42, in which the thumbnail images 38 relating to the "baseball," "The Yankees" and the "Yankee Stadium" respectively are displayed, is to be carried out every five seconds.

FIG. 2 shows an example for display of the related content listing 27 when the "baseball" is selected, by the keyword switching part 17, as a keyword for search.

In the case of FIG. 2, in the video mode, the music mode and the net moving image mode, contents relating to the keyword for search "baseball" are searched for by the content searching part 15, and their thumbnail images 32, 34 and 36 are being displayed. On the other hand, in the DLNA mode and the still image mode, since contents relating to the keyword for search "baseball" have not been found, the thumbnail images 33 and 35 not relating to the keyword for search "baseball" are being displayed. As the thumbnail images 33 and 35 not relating to the keyword for search, for example, the thumbnail images of the last reproduced contents of these modes are displayed.

In FIG. 2, in order that the modes for which contents relating to the "baseball" have not been found will be distinguished, the thumbnail images 33 and 35 of the DLNA mode and the still image mode are displayed in smaller size than the thumbnail images 32, 34 and 36 of the video mode, the music mode and the net moving image mode for which contents relating to the "baseball" have been found. The modes for which searches have been carried out successfully with a keyword and the modes for which searches have not been carried out successfully may be distinguished in a different way from this. For example, thumbnail images of the modes for which searches have not been carried out successfully may not be displayed, or display may be done that implies, "There are no contents for which searches have been carried out successfully."

In case a thumbnail image has been selected, through a user operation, from the related content listing 27 in accordance with the contents of an operation from the user inputting part 11 (Step S17), a related content selection instruction 29 is notified to the display controlling part 14 from the user inputting part 11.

Further, on an occasion of selection of a thumbnail image from the related content listing 27, a content of the thumbnail image that has been given a focus by a user may be reproduced and displayed in a display area of the thumbnail image. By doing this, before determining a content to select, the user is able to confirm what content the content corresponding to the thumbnail image is.

The display controlling part 14 allows the reproducing part 12 to obtain, from the content information storing part 18, a content of the thumbnail that has been notified by the related content selection instruction 29, and allows reproduction of a reproduced image 39 of the selected content to be started in full screen on the screen 21 (Step S18). At this time, in case the content of the thumbnail that has been selected through the user's operation is a One-seg, a DLNA, or a net moving image, the reproducing part 12 receives data via broadcasting, a network or the like, and reproduces it.

Further, the user inputting part 11 which accepts an operation of a related content selection instruction from a user is an example of the symbol selection instruction part of the present invention.

Further, in what is described above, the display controlling part 14, when notified of the related content listing instruction 28, provides the keyword specifying part 16 with a keyword specification instruction, and allows the keyword specifying part 16, the keyword switching part 17 and the content searching part 15 to perform sequential process, but the important thing is that the execution of the process in which the display controlling part 14 allows the reproducing part 12 to display the related content list screen (Step S16) is carried out at least after the related content listing instruction 28 has been notified to the display controlling part 14, and the execution of the process in the keyword specifying part 16, the keyword switching part 17 and the content searching part 15 may be started before the related content listing instruction 28 is notified to the display controlling part 14.

In case only the process in which the display controlling part 14 allows the reproducing part 12 to display the related content list screen (Step S16) is made to be performed after the related content listing instruction 28 has been notified to the display controlling part 14, and the execution of the process in the keyword specifying part 16, the keyword switching part 17 and the content searching part 15 is being carried out ahead of time, when the user has pressed a home key in order to provide the related content listing instruction 28, no listing of the last thumbnail images 37 will not be displayed, and the related content listing 27 will be displayed immediately.

Whether the execution of the process in the keyword specifying part 16, the keyword switching part 17 and the content searching part 15 is being carried out before the related content listing instruction 28 is notified to the display controlling part 14 may be determined in consideration of the throughput of the reproducing device 10. For example, the process in the keyword specifying part 16 the processing load of which is light may be started before the related content listing instruction 28 is notified, and the process in the keyword switching part 17 and the content searching part 15 may be performed after the related content listing instruction 28 has been notified.

Furthermore, the plural keywords specified by the keyword specifying part 16 may be specified every program or every tune, and may be, one program, one tune or the like being partitioned into plural periods of time, specified every period of time gained through this partitioning.

Further, in a case where the specified plural keywords are specified every program or every tune, one program and one tune are examples of the one unit of the present invention. Furthermore, in a case where one program, one tune or the like is partitioned into plural periods of time and a keyword is specified every period of time gained through this partitioning, the individual periods of time are examples of the one unit of the present invention.

Figure 5:
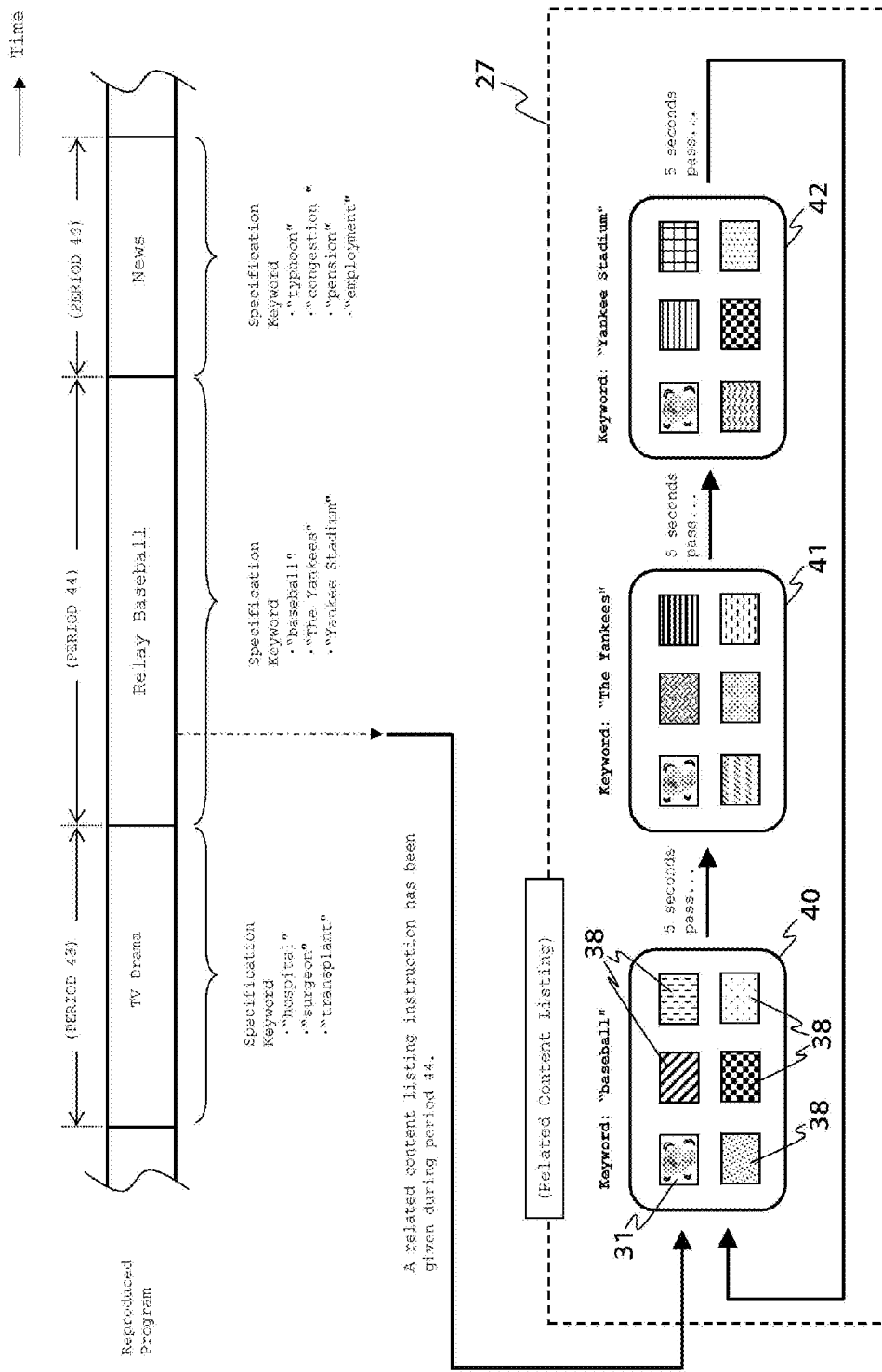
FIG. 5 is a diagram describing related content listing in a case where plural keywords specified by the keyword specifying part of the reproducing device of Embodiment 1 of the present invention are specified every program.

FIG. 5 shows a diagram that describes related content listing in a case where plural keywords specified by the keyword specifying part 16 are specified every program.

Suppose that, as shown in FIG. 5, three programs "TV Drama," "Relay Baseball" and "News" are broadcasted in this order and are broadcasted during the periods of time, a period 43, a period 44 and a period 45, respectively.

The keyword specifying part 16 specifies, by extracting plural keywords from program contents data that were arranged every program, plural keywords.

Further, the plural keywords in this case that are contained in program contents data are examples of the keywords that are prepared beforehand of the present invention.

Three keywords "hospital," "surgeon" and "transplant" in the period 43 during which a TV drama is broadcasted, three keywords "baseball," "The Yankees" and "Yankee Stadium" in the period 44 during which a relay of a baseball game is broadcasted, and four keywords "typhoon," "congestion," "pension" and "employment" in the period 45 during which the news is broadcasted are extracted from the respective program contents data and specified.

The keyword specifying part 16 extracts and specifies plural keywords complying with the timing when a user makes a request for related content listing by the user inputting part 11.

For example, in case the user has made, during the period 44, a request for related content listing by the user inputting part 11, the keyword specifying part 16 extracts, from the program contents data of the "Relay Baseball" that is being reproduced then, three keywords "baseball," "The Yankees" and "Yankee Stadium" and specifies them.

At this time, since the keyword switching part 17 switches the three keywords "baseball," "The Yankees" and "Yankee Stadium" every constant interval successively that have been specified by the keyword specifying part 16, and selects a keyword for search, in the related content listing 27, as shown in FIG. 5, switching for display with the related content list screen display 40-42, in which the thumbnail images 38 relating to the "baseball," "The Yankees" and the "Yankee Stadium" respectively are displayed, is carried out every five seconds.

Figure 6:
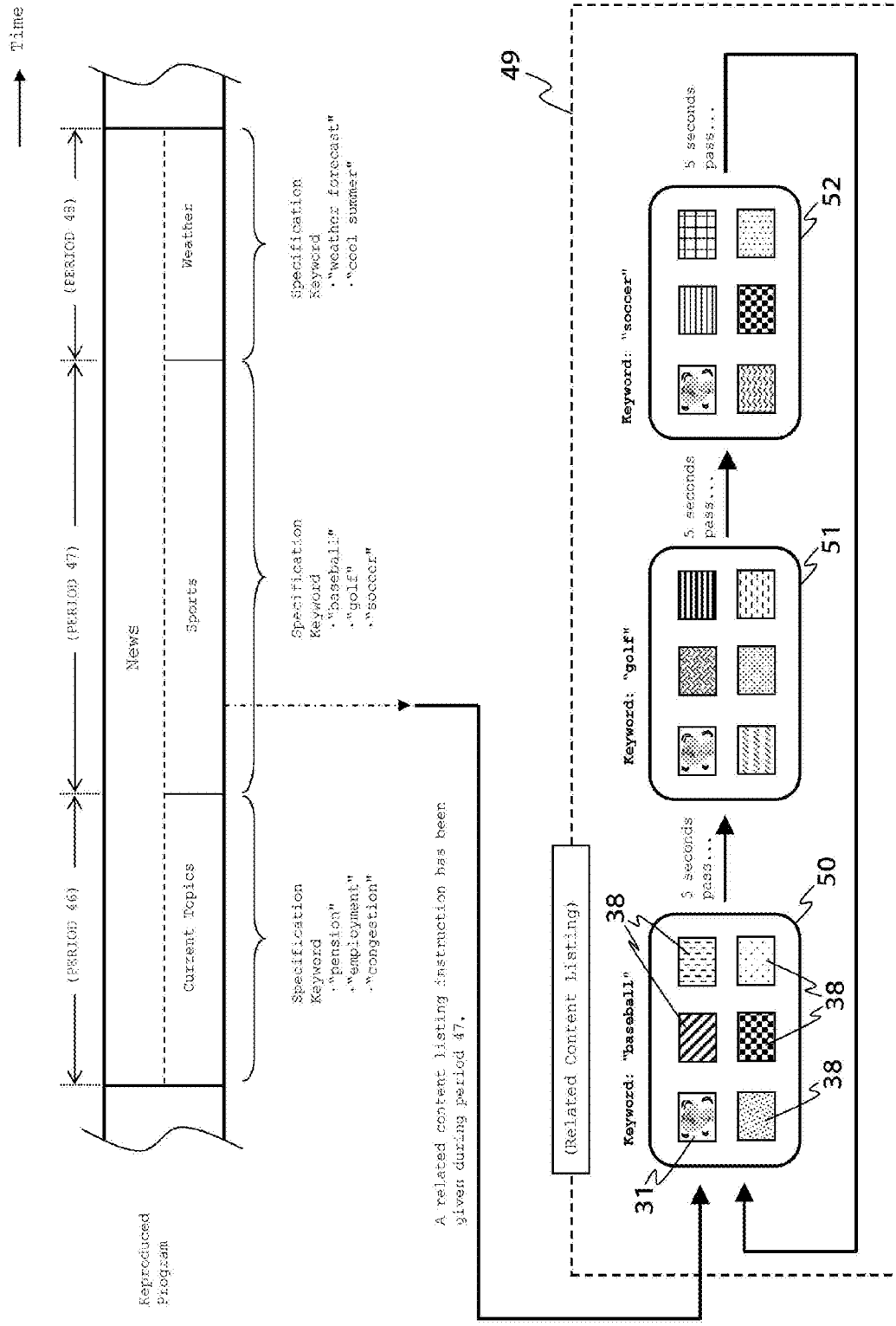
FIG. 6 is a diagram describing related content listing in a case where plural keywords specified by the keyword specifying part of the reproducing device of Embodiment 1 of the present invention are, one program being partitioned into plural periods of time, specified every period of time gained through this partitioning.

FIG. 6 shows a diagram that describes related content listing in a case where plural keywords specified by the keyword specifying part 16 are, one program being partitioned into plural periods of time, specified every period of time gained through this partitioning.

As shown in FIG. 6, one program "News" is partitioned into plural periods of time (a period 46, a period 47, a period 48), and the keyword specifying part 16 extracts and specifies plural keywords complying with the timing when a user makes a request for related content listing by the user inputting part 11.

For example, within a time during which the one program "News" is being broadcasted, program contents data that are sent out through data broadcasting are different depending on the periods of time, and the keyword specifying part 16 specifies, from the program contents data that are sent out through the data broadcasting, plural keywords corresponding to the individual periods of time.

For example, in case the user has made, during the period 47 of the program "News" during which information about sport is being broadcasted, a request for related content listing by the user inputting part 11, the keyword specifying part 16 extracts, from the program contents data held by the data broadcasting that is being received by the data receiving part 13 then, three keywords "baseball," "golf" and "soccer" and specifies them.

At this time, since the keyword switching part 17 switches the three keywords "baseball," "golf" and "soccer" every constant interval successively that have been specified by the keyword specifying part 16, and selects a keyword for search, in the related content listing 49, as shown in FIG. 6, switching for display with related content list screen display 50-52, in which the thumbnail images 38 relating to the "baseball," the "golf" and the "soccer" respectively are displayed, is carried out every five seconds.

Furthermore, as a keyword the keyword specifying part 16 specifies, a keyword that has been extracted from subtitling data may be used.

Figure 7:
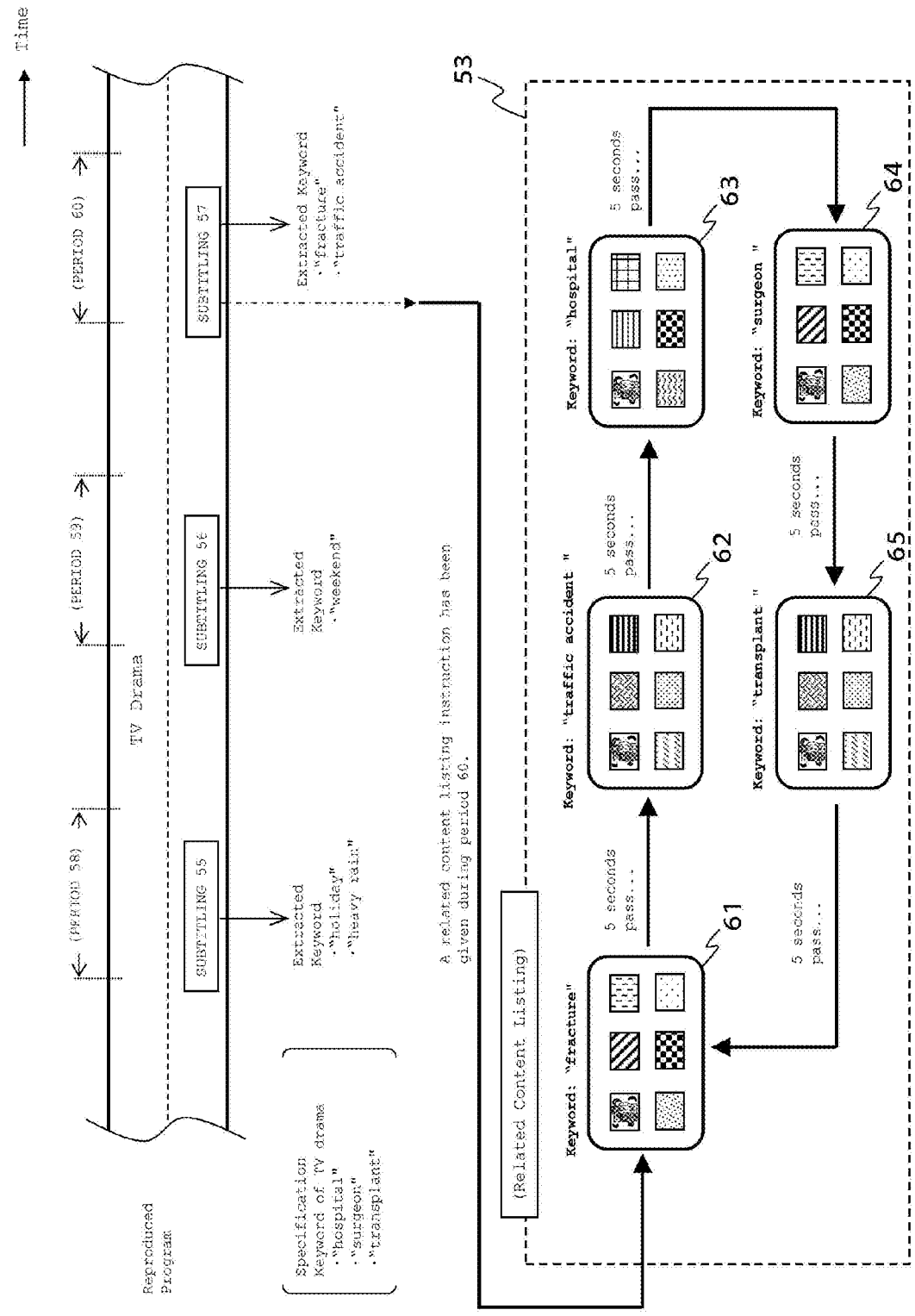
FIG. 7 is a diagram describing related content listing in a case where plural keywords specified by the keyword specifying part of the reproducing device of Embodiment 1 of the present invention are also extracted from subtitling data.

FIG. 7 shows a diagram that describes related content listing that carries out display also using, as plural keywords specified by the keyword specifying part 16, keywords that have been extracted from subtitling data.

In FIG. 7, subtitling 55, subtitling 56 and subtitling 57 show periods in the program "TV Drama," during which respective subtitling is displayed. Periods 58, 59 and 60, which correspond to the subtitling 55, 56 and 57 respectively, show periods for extracting keywords from individual subtitling. The periods 58, 59 and 60 for extracting keywords from individual subtitling are set up so that, even after the display of the individual subtitling 55, 56 and 57 has vanished, their subtitling data will be used for extraction of keywords within a predetermined period (for example, for three seconds after the display has vanished).

In case a user has made, during a period for extracting keywords from subtitling, a request for related content listing by the user inputting part 11, the keyword specifying part 16 extracts, from the subtitling data corresponding to the period, keywords in addition to the keywords specified by the program.

For example, in case the user has made, during the period 60 corresponding to the display of the subtitling 57 in the program "TV Drama," a request for related content listing by the user inputting part 11, the keyword specifying part 16 also extracts, from the subtitling data corresponding to the subtitling 57, keywords in addition to the three keywords "hospital," "surgeon" and "transplant" specified regarding the program "TV Drama," and also notifies the keyword switching part 17 of two keywords "fracture" and "traffic accident" that have been extracted from the subtitling data as keywords that have been specified.

Since the keyword switching part 17 switches the five keywords "fracture," "traffic accident," "hospital," "surgeon"

and "transplant" every constant interval successively that have been specified by the keyword specifying part 16, and selects a keyword for search, in the related content listing 53, as shown in FIG. 7, switching for display with related content list screen display 61-65, in which the thumbnail images relating to the "fracture," the "traffic accident," the "hospital," the "surgeon" and the "transplant" respectively are displayed, is carried out every five seconds.

Next, an action is described with respect to a case where one period for specifying keywords by the keyword specifying part 16 terminates during related content listing being carried out.

Figure 8:
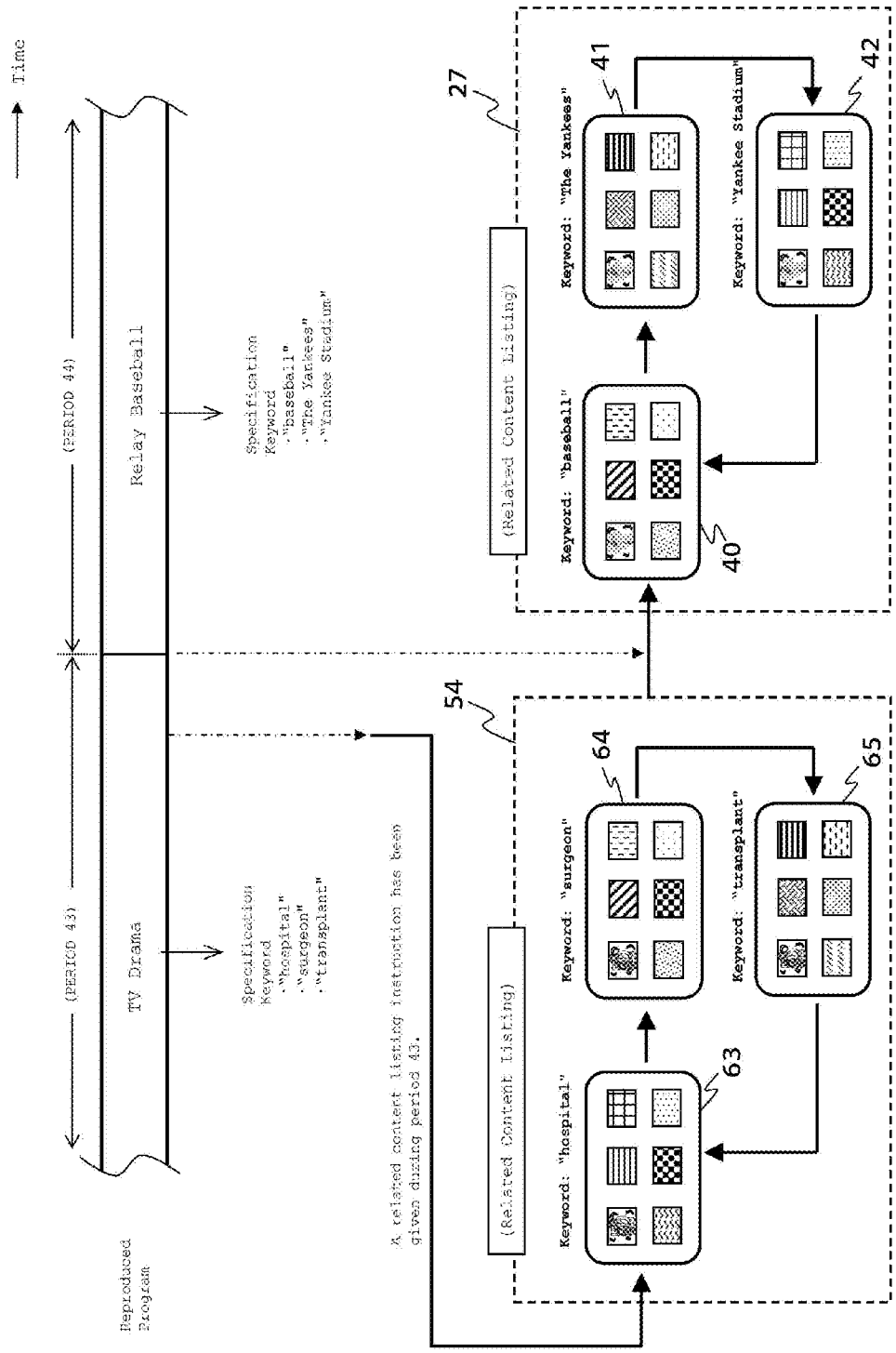
FIG. 8 is a diagram describing related content listing in a case where a period for specifying keywords by the keyword specifying part of the reproducing device of Embodiment 1 of the present invention terminates during related content listing being carried out.

FIG. 8 shows a diagram that describes related content listing in a case where a period for specifying keywords by the keyword specifying part 16 terminates during related content listing being carried out.

FIG. 8 concerns, similarly to FIG. 5, an example of a case where plural keywords specified by the keyword specifying part 16 are specified every program, and the "Relay Baseball" is to be broadcasted during a period of time of the period 44 that follows a period of time of the period 43 during which the "TV Drama" is broadcasted.

In case a user has made, during the period 43 during which the "TV Drama" is being broadcasted, a request for related content listing by the user inputting part 11, the keyword specifying part 16 extracts, from the program contents data of the "TV Drama" that is being reproduced then, the three keywords "hospital," "surgeon" and "transplant" and specifies them. And, since the keyword switching part 17 switches the three keywords "hospital," "surgeon" and "transplant" every constant interval successively that have been specified by the keyword specifying part 16, and selects a keyword for search, in related content listing 54, as shown in FIG. 8, switching for display with the related content list screen display 63-65, in which the thumbnail images relating to the "hospital," the "surgeon" and the "transplant" respectively are displayed, is carried out every five seconds.

And, since when the period 43 during which the "TV Drama" is being broadcasted has terminated and the next period 44 begins while the related content listing 54 is being displayed, the program contents data changes to that of the "Relay Baseball," the plural keywords specified by the keyword specifying part 16 also change. Since the keywords group that is used for switching and displaying in the related content listing alters, when the period 43 changes to the period of time of the period 44, the related content listing 54 alters to the related content listing 27. Namely, after the period 43 has terminated, switching for display with the related content list screen display 40-42, in which the thumbnail images relating to the three keywords "baseball," "The Yankees" and "Yankee Stadium" that have been extracted from the program contents data of the "Relay Baseball" respectively are displayed, begins to be carried out every five seconds.

Further, here, specified keywords are altered with the period of time changing but, even if the period of time changes, the keywords of the previous period of time may be used in succession to display the related content listing until predetermined time elapses after that, or such an operation that enables a user to give an instruction to renew the keywords may be set up so that, even if the period of time changes, the keywords of the previous period of time will be used in succession to display the related content listing until the operation is carried out. In such cases, in FIG. 8, even in the case where the period 43 has terminated when the related content listing 54 is being displayed, the related content listing 54 is continuously displayed for the predetermined time after the termination of the period 43, or until the user gives an renewal instruction of the keywords.

There are cases where a user desires to reproduce for confirmation temporarily the related content that was selected from the thumbnail images displayed in the related content listing. In such cases, it is useful if, after the related content the user desires has been allowed to be reproduced and displayed, he or she is able to return to the related content listing when the related content was selected.

Figure 9:
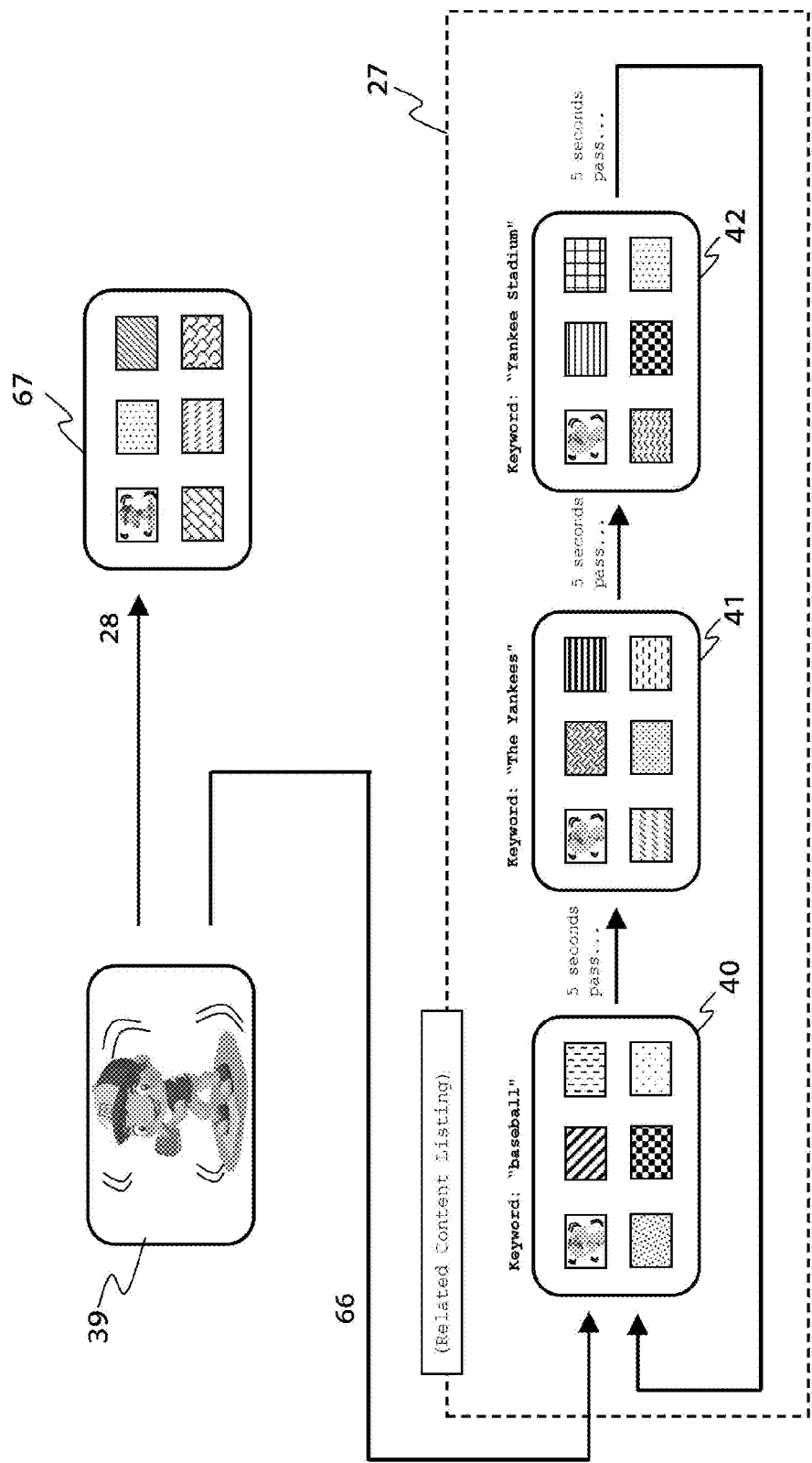
FIG. 9 is a diagram describing related content listing such that, in the reproducing device of Embodiment 1 of the present invention, it has been possible to return, after allowing the related content to be reproduced and displayed, to the related content listing when the related content was selected.
Figure 10:
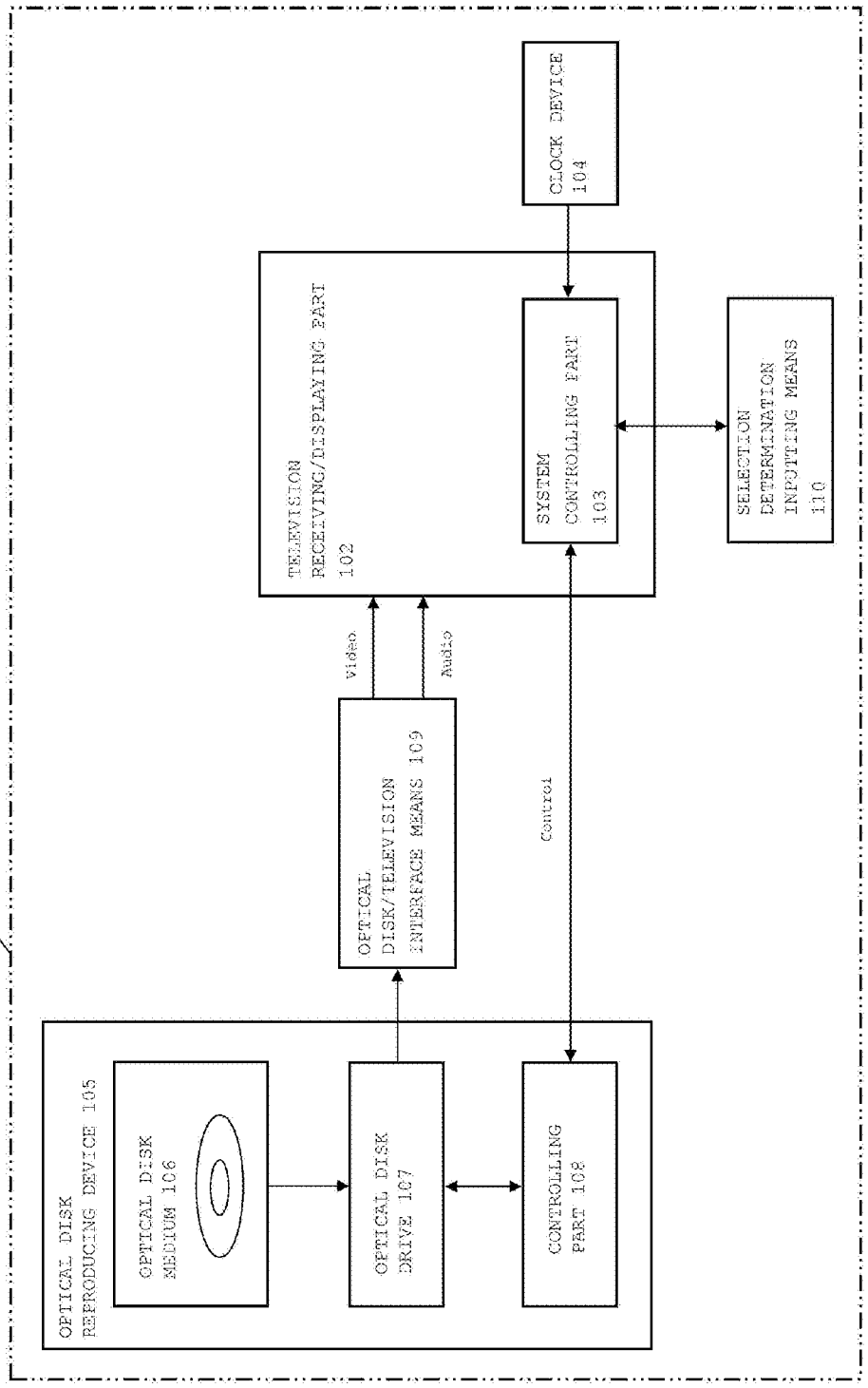
Figure 11:
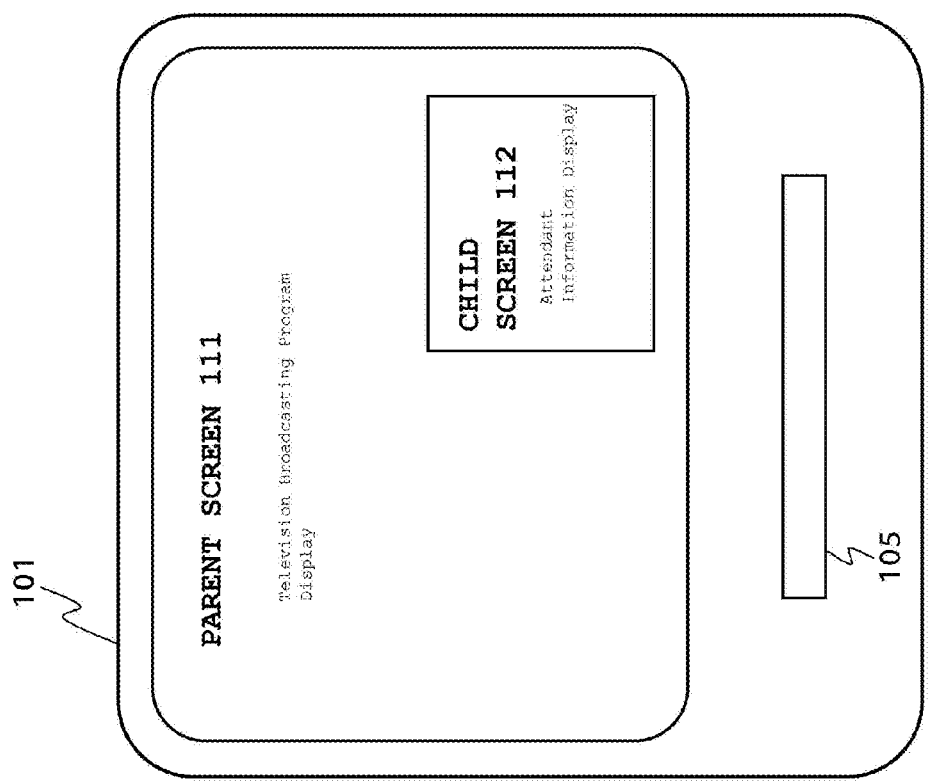
FIG. 11 is a diagram showing an example of the attendant information displayed on a screen of the conventional television device.

FIG. 9 shows a diagram that describes related content listing of the reproducing device of present Embodiment 1 such that it has been possible to return, after allowing the related content to be reproduced and displayed, to the related content listing when the related content was selected.

FIG. 9 shows a state where, in FIG. 3, a thumbnail is selected from the related content listing 27, and the reproduced image 39 of the selected content corresponding to the thumbnail has been displayed on the full screen.

In a state where the reproduced image 39 of the selected content is being displayed on the full screen, when a user takes an input from a home key at the user inputting part 11, the related content listing instruction 28 is notified to the display controlling part 14 from the user inputting part 11 and, on the screen 21, content listing 67 relating to the selected content is displayed. Since, in the content listing 67, thumbnail images of the contents that have been searched for using the keywords that have been specified from the content that is being reproduced in the reproduced image 39 of the selected content are displayed, the keywords are different from those that were used to display the related content listing 27 utilized to select the selected content, and a list of the contents that is different from the related content listing 27 will be displayed.

Here, a setup to return to the last related content listing but one is allocated to a "Return" key and so on of a remote controller. In a state where the reproduced image 39 of the selected content is being displayed on the full screen, when a user takes an input from the "Return" key, a related content selection cancellation instruction 66 is notified to the display controlling part 14 from the user inputting part 11.

The display controlling part 14, receiving notification of the related content selection cancellation instruction 66, controls the reproducing part 12 so that the last screen but one on which the reproduced image 39 of the selected content is displayed on the full screen, namely, the screen at the time of selection of the selected content will be displayed. By means of this, on the screen 21, the related content listing 27 at the time of display of the thumbnail images corresponding to the selected content is displayed.

By coping in this manner, even if a content corresponding to a thumbnail that has been displayed in the related content listing 27 is temporarily reproduced, a user will be able to return to the same related content listing 27 again and to select another content.

Furthermore, similarly to what is described with FIG. 8, even in the case where, in a state where the reproduced image 39 of the selected content is being displayed on the full screen, the period when the thumbnail images corresponding to the selected content (for example, the period 43 of FIG. 8) has been selected terminates, and the specified keywords have changed to those of the next different period of time (for example, the period 44 of FIG. 8), through an input from the "Return" key, the related content listing 27 that were being displayed in the previous period of time (the period 43) can be restored.

Further, the user inputting part 11 which notifies the related content selection cancellation instruction 66 with an input from the "Return" key is an example of the selection cancellation instruction part of the present invention.

Further, in present Embodiment 1 above, description was given assuming that plural keywords are specified regarding all the periods of time, but a period of time with one keyword specified, or a period of time with no keyword specified may exist.

In the case of a period of time with one keyword specified, on an occasion of the listing of the related content, switching for display is not carried out every constant time interval by switching keywords, and the same list screen will be continuously displayed. In the case of a period of time with no keyword specified, on an occasion of the listing of the related content, for example, along with display implying that no keyword for search has been successfully extracted, a screen for listing the thumbnail images of the last contents of individual modes is continuously displayed.

Further, the period of time with plural keywords specified is an example of the predetermined one period of time of the present invention.

Furthermore, in present Embodiment 1, plural keywords are extracted from program contents data, subtitling data or the like and specified, but plural keywords corresponding to individual programs, individual periods of time or the like may be set up beforehand with the keywords being stored, along with the metadata 24, in the content information storing part 18 and so on so that keywords will be specified by taking out, from the content information storing part 18, the keywords corresponding to the content being reproduced that have been set up beforehand.

Further, the content information storing part 18, in this case, which stores plural keywords corresponding to the individual periods of time that have been set up beforehand, is an example of the allocated keyword storing part of the present invention.

Furthermore, in present Embodiment 1, description was given assuming that one thumbnail image is displayed regarding one input medium (mode) but, in case plural relating contents have been detected from one medium, plural thumbnail images may be displayed every those contents. For example, in FIG. 2, in case two contents exist, which are searched for with the keyword "baseball," in the video contents that have been recorded, one more thumbnail image of the video mode is additionally displayed on the screen 21.

The present invention can apply, by allowing thumbnail images corresponding to plural relating contents detected from one medium to be displayed simultaneously on the related content listing, to such a reproducing device as a player dedicated to video with only one input medium.

Furthermore, one thumbnail image is allowed to be displayed regarding one input medium and, in case plural contents are detected with a keyword for search regarding one input medium, within the period during which the thumbnail images corresponding to the keyword are being displayed, the thumbnail images corresponding to those plural contents may be switched and displayed. Furthermore, every time display is carried out after switching to a relevant keyword in the related content listing, one of the thumbnail images corresponding to the plural contents that have been detected regarding one input medium may be successively displayed.

Furthermore, in present Embodiment 1, description was given assuming that keywords are switched every five seconds at the keyword switching part 17, but an interval for switching keywords may be shorter than five seconds, or longer than five seconds. Time of an interval for switching would be set up in view of the number of the thumbnail images allowed to be displayed in the related content listing, the throughput of the reproducing device, or the like. Furthermore, switching intervals of keywords may be different predetermined intervals for switching, not constant intervals for switching. For example, plural keywords that have been specified are weighted, and switching intervals of keywords are set up so that time for listing a thumbnail image of a content relating to a keyword with a higher priority will be longer than time for listing a thumbnail image of a content relating to a keyword with a lower priority.

Furthermore, the program of the present invention is a program for causing a computer to execute the operations of said keyword specifying step of specifying a plurality of keywords corresponding to said one unit being reproduced; said keyword switching step of switching the plural keywords that have been specified, by every constant or different time interval, to choose one keyword; and said list display step of allowing the symbols of the respective contents of video or sound relating to each of said keywords that have been chosen by said keyword switching step to be switched and to be listed, of the above-described reproducing method, and is a program which operates in cooperation with the computer.

Furthermore, a recording medium of invention related to the present invention is a recording medium recording the program for causing a computer to execute the operations of said keyword specifying step of specifying a plurality of keywords corresponding to said one unit being reproduced; said keyword switching step of switching the plural keywords that have been specified, by every constant or different time interval, to choose one keyword; and said list display step of allowing the symbols of the respective contents of video or sound relating to each of said keywords that have been chosen by said keyword switching step to be switched and to be listed, of the above-described reproducing method, and is readable by the computer, whereby said program read out is used in cooperation with said computer.

Furthermore, the above "operations of said steps" of the present invention means all or a part of the operations of said steps.

Furthermore, one utility form of the program of the present invention may be an aspect of being recorded on a recording medium, such as ROM and so forth, which can be read by a computer, and of operating in cooperation with the computer.

Furthermore, one utility form of the program of the present invention may be an aspect of being transmitted inside transmission media such as a transmission medium like the Internet and so forth, light or radio waves and so forth, and of being read by a computer to operate in cooperation with the computer.

Furthermore, the above-described computer of the present invention may be firmware, an OS, or the like, not limited to pure hardware such as a CPU and so forth, and may be one that further includes peripheral equipment.

Further, as described above, a configuration of the present invention may be realized through software, or may be realized through hardware.

INDUSTRIAL APPLICABILITY

The reproducing device, the reproducing method and so forth according to the present invention produce an advantageous effect in that a content a user desires, which is a content related to the content being reproduced, is found more easily than before, and are useful for a reproducing device, a reproducing method and so forth which can reproduce video, music or the like of plural media.

DESCRIPTION OF SYMBOLS

10 reproducing device
11 user inputting part 12 reproducing part
13 data receiving part
14 display controlling part
15 content searching part
16 keyword specifying part
17 keyword switching part
18 content information storing part
19 terminal information storing part
20 network
21 screen
22 speaker
23 terminal information
24 metadata
25 thumbnail
26 content
27 related content listing
28 related content listing instruction
29 related content selection instruction
30 keyword display
31 reproduced image
32-36 thumbnail image
37 last thumbnail image
38 thumbnail image of related content
39 reproduced image of selected content
40-42 related content list screen display
43-48 period
49 related content listing
50-52 related content list screen display
53 related content listing
54 related content listing
55-57 subtitling
58-60 period
61-65 related content list screen display
66 related content selection cancellation instruction
67 content listing relating to selected content

The invention claimed is:

1. A producing device comprising:
a reproducing part which reproduces video or sound;
a list display instruction part which gives an instruction for list display of symbols of contents of video or sound relating to one unit of said video or sound being reproduced;
a content relation information storing part in which content relation information is stored that is constituted by the symbol of said content and a keyword that is appended to the content;
a keyword specifying part which specifies a plurality of keywords corresponding to said one unit being reproduced;
a keyword switching part which switches the plural keywords that have been specified by said keyword specifying part, by every constant or different time interval, to choose one keyword;
a symbol interchanging part which searches for, with a keyword that has been chosen by said keyword switching part, said keywords of said content relation information of said content relation information storing part, to detect relating contents, specifies the symbols of the relating contents and, every time the keywords are switched by said keyword switching part, interchanges said symbols that have been specified; and
a list display controlling part which allows the symbols that have been specified by said symbol interchanging part to be switched by said reproducing part and to be listed on a screen, wherein
said list display controlling part acts at least after said instruction for list display has been supplied,
said one program or one tune of the video or sound is partitioned into plural periods of time, and said one unit is a predetermined one period of time out of said plural periods of time,
in case said predetermined one period of time has terminated when said list display is being carried out,
said keyword specifying part newly specifies a plurality of keywords corresponding to the next one period of time,
said keyword switching part switches the plural keywords that have been newly specified by said keyword specifying part, by every constant or different time interval, to choose one keyword,
said symbol interchanging part detects, with a keyword that has been chosen by said keyword switching part from among said plural keywords that have been newly specified, relating contents, specifies the symbols of the relating contents and, every time the symbols are switched by said keyword switching part, interchanges the specified symbols, and
said list display controlling part allows the symbols that have been specified by said symbol interchanging part to be switched by said reproducing part and to be listed on said screen.

2. A reproducing device comprising:
a reproducing part which reproduces video or sound;
a list display instruction part which gives an instruction for list display of symbols of contents of video or sound relating to one unit of said video or sound being reproduced;
a content relation information storing part in which content relation information is stored that is constituted by the symbol of said content and a keyword that is appended to the content;
a keyword specifying part which specifies a plurality of keywords corresponding to said one unit being reproduced;
a keyword switching part which switches the plural keywords that have been specified by said keyword specifying part, by every constant or different time interval, to choose one keyword;
a symbol interchanging part which searches for, with a keyword that has been chosen by said keyword switching part, said keywords of said content relation information of said content relation information storing part, to detect relating contents, specifies the symbols of the relating contents and, every time the keywords are switched by said keyword switching part, interchanges said symbols that have been specified;
a list display controlling part which allows the symbols that have been specified by said symbol interchanging part to be switched by said reproducing part and to be listed on a screen;
a symbol selection instruction part which selects, from among said symbols that are being listed, any symbol and gives an instruction; and
a selection cancellation instruction part which provides a selection cancellation instruction to cancel a selection instruction action by said symbol selection instruction part, wherein
said list display controlling part acts at least after said instruction for list display has been supplied,
said one program or one tune of the video or sound is partitioned into plural periods of time, and said one unit is a predetermined one period of time out of said plural periods of time, and
said reproducing part enlarges, when a symbol has been selected by said symbol selection instruction part, a display size of the content corresponding to the selected symbol to carry out reproduction and display on said screen, and restores, in case said selection cancellation instruction has been given by said selection cancellation instruction part when the content corresponding to said selected symbol is being reproduced and displayed, the list display that was displayed when said symbol was selected, to carry out the list display on said screen.

3. A producing device comprising:

a reproducing part which reproduces video or sound;

a list display instruction part which gives an instruction for list display of symbols of contents of video or sound relating to one unit of said video or sound being reproduced;

a content relation information storing part in which content relation information is stored that is constituted by the symbol of said content and a keyword that is appended to the content;

a keyword specifying part which specifies a plurality of keywords corresponding to said one unit being reproduced;

a keyword switching part which switches the plural keywords that have been specified by said keyword specifying part, by every constant or different time interval, to choose one keyword;

a symbol interchanging part which searches for, with a keyword that has been chosen by said keyword switching part, said keywords of said content relation information of said content relation information storing part, to detect relating contents, specifies the symbols of the relating contents and, every time the keywords are switched by said keyword switching part, interchanges said symbols that have been specified; and a list display controlling part which allows the symbols that have been specified by said symbol interchanging part to be switched by said reproducing part and to be listed on a screen, wherein said list display controlling part acts at least after said instruction for list display has been supplied, and said list display controlling part also allows the symbols to be displayed on said list display, which are symbols corresponding to the contents that do not relate to said keyword and that are such contents as another medium has besides a medium that has the contents with said corresponding symbols being displayed related to said keyword, and allows the symbols corresponding to the contents said another medium has to be displayed in smaller size than the symbols of the contents relating to said keyword.

* * * * *